US012657225B2

(12) United States Patent     (10) Patent No.:   US 12,657,225 B2

Shimura et al.        (45) Date of Patent:    Jun. 16, 2026

(54) INFORMATION PROCESSING APPARATUS, INFORMATION PROCESSING METHOD, AND STORAGE MEDIUM

(71) Applicant: NEC Corporation, Tokyo (JP)

(72) Inventors: Noritaka Shimura, Tokyo (JP); Takuya Sera, Tokyo (JP); Yuki Taya, Tokyo (JP); Izumi Kuwata, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 18/985,660

(22) Filed: Dec. 18, 2024

(65) Prior Publication Data

US 2025/0231978 A1     Jul. 17, 2025

(30) Foreign Application Priority Data

Jan. 15, 2024   (JP) ................................. 2024-003931

(51) Int. Cl.
    *G06F 16/335*      (2019.01)
    *G06F 16/383*      (2019.01)

(52) U.S. Cl.
    CPC .......... *G06F 16/335* (2019.01); *G06F 16/383* (2019.01)

(58) Field of Classification Search
    None
    See application file for complete search history.

(56) References Cited

U.S. PATENT DOCUMENTS

| | | | | |
|---|---|---|---|---|
| 2009/0216625 A1* | 8/2009 | Erlebacher | ........... | G06Q 10/087 |
| | | | | 704/9 |
| 2019/0073601 A1* | 3/2019 | Alkan | .................... | G06N 20/00 |

FOREIGN PATENT DOCUMENTS

| | | |
|---|---|---|
| JP | 2005-167452 A | 6/2005 |
| JP | 2015-028767 A | 2/2015 |
| JP | 2018-084884 A | 5/2018 |
| JP | 2022-063884 A | 4/2022 |
| WO | 2015/178078 A | 11/2015 |

* cited by examiner

*Primary Examiner* — Kannan Shanmugasundaram
(74) *Attorney, Agent, or Firm* — Sughrue Mion, PLLC

(57) ABSTRACT

To provide a technique for proposing a foodstuff suitable for a content-themed food product, based on information about the content. An information processing apparatus includes: a content information obtaining section that obtains content information that indicates content; a content emotion information generation section that generates, with reference to the content information, content emotion information that indicates an emotion related to the content; and a foodstuff information output section that outputs, with reference to the content emotion information and foodstuff emotion information that indicates emotions related to respective foodstuffs included in a foodstuff group, foodstuff information that indicates one or more foodstuffs from the foodstuff group, the one or more foodstuffs being related to an emotion correlating with the emotion indicated by the content emotion information.

20 Claims, 6 Drawing Sheets

FLOW OF PROCESSING IN INFORMATION PROCESSING APPARATUS

FIG. 6

PROCESS CARRIED OUT BY FOODSTUFF INFORMATION OUTPUT SECTION

CONTENT EMOTION INFORMATION CE1

| CONTENT | TYPES OF EMOTIONS | | | | |
|---|---|---|---|---|---|
| | HAPPINESS | SADNESS | FEAR | LOVE | ANGER |
| CONTENT | 4 | 3 | 2 | 4 | 3 |

FOODSTUFF EMOTION INFORMATION FSE1

| FOODSTUFF GROUP | TYPES OF EMOTIONS | | | | |
|---|---|---|---|---|---|
| | HAPPINESS | SADNESS | FEAR | LOVE | ANGER |
| APPLE | 4 | 3 | 2 | 4 | 3 |
| LEMON | 2 | 3 | 4 | 3 | 4 |
| CHOCOLATE | 3 | 4 | 3 | 2 | 4 |
| PEANUTS | 3 | 3 | 1 | 3 | 1 |
| SODA | 4 | 3 | 1 | 4 | 3 |
| COFFEE | 1 | 4 | 2 | 2 | 2 |

CORRELATION ANALYTIC MODEL AM

| FOODSTUFF GROUP | CORRELATIVE SCORE | THRESHOLD |
|---|---|---|
| APPLE | 4 | 3 |
| LEMON | 2 | 3 |
| CHOCOLATE | 2 | 3 |
| PEANUTS | 2 | 3 |
| SODA | 3 | 3 |
| COFFEE | 1 | 2 |

FOODSTUFF INFORMATION FS1

| RANK | FOODSTUFF |
|---|---|
| 1 | APPLE |
| 2 | SODA |

INFORMATION PROCESSING APPARATUS, INFORMATION PROCESSING METHOD, AND STORAGE MEDIUM

This Nonprovisional application claims priority under 35 U.S.C. § 119 on Patent Application No. 2024-003931 filed in Japan on Jan. 15, 2024, the entire contents of which are hereby incorporated by reference.

TECHNICAL FIELD

The present disclosure relates to an information processing apparatus, an information processing method, and a storage medium.

BACKGROUND ART

There are known information processing techniques for proposing foodstuffs based on some information. An example of such techniques for proposing foodstuffs may be an information processing apparatus that provides, in accordance with a recipe, information about an appropriate foodstuff based on a nutrient that the user desires to intake (e.g., Patent Literature 1).

CITATION LIST

Patent Literature

[Patent Literature 1]
Japanese Patent Application Publication Tokukai No. 2018-84884

SUMMARY OF INVENTION

Technical Problem

Food products created based on content (creation), such as movies, dramas, and comics, are products of high demand, which remind anyone who eats them of the content, and various, content-themed food products have been developed. However, conventionally, the development of such food products has strongly depended on the developer's imagination. Especially, because selection of foodstuffs exerts a large influence on important elements of food products, such as tastes and appearances, the selection is a labor-intensive and time-consuming task for the developer. Therefore, there is a need for a technique capable of technically connecting content with foodstuffs to assist the developer in selecting foodstuffs.

The present disclosure has been made in view of this problem, and an example object thereof is to provide a technique for proposing a foodstuff suitable for a content-themed food product based on information about the content.

Solution to Problem

An information processing apparatus in accordance with an example aspect of the present disclosure includes at least one processor, the at least one processor carrying out: a content information obtaining process of obtaining content information that indicates content; a content emotion information generation process of generating, with reference to the content information, content emotion information that indicates an emotion related to the content; and a foodstuff information output process of outputting, with reference to the content emotion information and foodstuff emotion information that indicates emotions related to respective foodstuffs included in a foodstuff group, foodstuff information that indicates one or more foodstuffs from the foodstuff group, the one or more foodstuffs being related to an emotion correlating with the emotion indicated by the content emotion information.

An information processing method in accordance with an example aspect of the present disclosure includes: a content information obtaining process of obtaining, by at least one processor, content information that indicates content; a content emotion information generation process of generating, by the at least one processor, with reference to the content information, content emotion information that indicates an emotion related to the content; and a foodstuff information output process of outputting, by the at least one processor, with reference to the content emotion information and foodstuff emotion information that indicates an emotion related to each foodstuff included in a foodstuff group, foodstuff information that indicates one or more foodstuffs in the foodstuff group, the one or more foodstuffs being related to an emotion correlating with the emotion indicated by the content emotion information.

A non-transitory storage medium in accordance with an example aspect of the present disclosure stores a program for causing a computer to carry out: a content information obtaining process of obtaining content information that indicates content; a content emotion information generation process of generating, with reference to the content information, content emotion information that indicates an emotion related to the content; and a foodstuff information output process of outputting, with reference to the content emotion information and foodstuff emotion information that indicates an emotion related to each foodstuff included in a foodstuff group, foodstuff information that indicates one or more foodstuffs in the foodstuff group, the one or more foodstuffs being related to an emotion correlating with the emotion indicated by the content emotion information.

Advantageous Effects of Invention

According to an example aspect of the present disclosure, it is possible to achieve an example advantage of being capable of providing a technique for proposing a foodstuff suitable for a content-themed food product based on information about the content.

BRIEF DESCRIPTION OF DRAWINGS

FIG. 6 is a diagram for describing an example of processing carried out by a foodstuff information output section in accordance with the present disclosure.

EXAMPLE EMBODIMENTS

Figure 1:
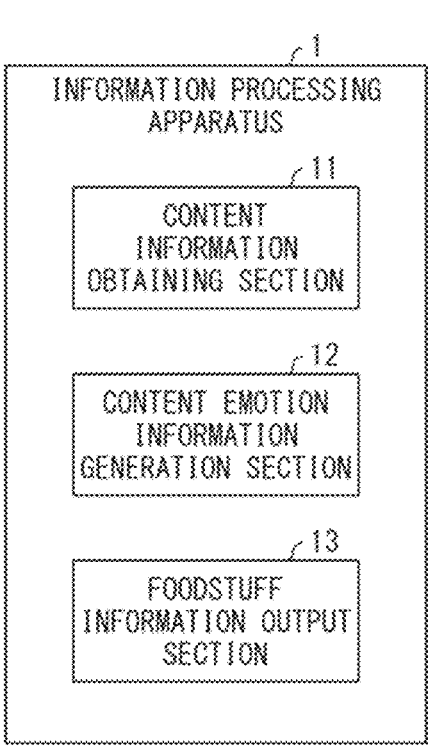
FIG. 1 is a block diagram illustrating the configuration of an information processing apparatus in accordance with the present disclosure.

Example embodiments of the present invention will be described below by way of example. It should be noted that the present invention is not limited to the example embodiments described below, but may be altered in various ways by a skilled person within the scope of the claims. For example, any example embodiment derived by appropriately combining technical means employed in the example embodiments described below can be within the scope of the present invention. Further, any example embodiment derived from appropriately omitting some of the technical means employed in the example embodiments described below can also be within the scope of the present invention. Furthermore, an example advantage to which reference is made in each of the example embodiments described below is an example of the advantage expected in that example embodiment, and does not define the extension of the present invention. Therefore, any example embodiment which does not provide the example advantage to which reference is made in each of the example embodiments described below can also be within the scope of the present invention.

First Example Embodiment

A first example embodiment, which is an example of an embodiment of the present invention, will be described in detail with reference to the drawings. The present example embodiment is a basic form of each example embodiment discussed later. It should be noted that the scope of an application of technical means employed in the present example embodiment is not limited to the present example embodiment. That is, each technical means employed in the present example embodiment can be employed also in another example embodiment included in the present disclosure, provided that no particular technical problems occur. In addition, each technical means indicated in the drawings referred to for discussing the present example embodiment can be employed also in another example embodiment included in the present disclosure, provided that no particular technical problems occur.

(Configuration of Information Processing Apparatus 1)

The following description will discuss the configuration of an information processing apparatus 1 in accordance with the present example embodiment with reference to FIG. 1. FIG. 1 is a block diagram illustrating the configuration of the information processing apparatus 1. As illustrated in FIG. 1, the information processing apparatus 1 includes a content information obtaining section 11, a content emotion information generation section 12, and a foodstuff information output section 13.

(Content Information Obtaining Section 11)

The content information obtaining section 11 obtains content information that indicates content. Here, examples of the content may include visual content, text content, image content, audio content, and a part of any of these types of content. Examples of the visual content may include a movie, a television program, such as a drama program or a documentary program, and the like. Examples of the text content may include a novel, an essay, and the like. Examples of the image content may include an illustration, a photograph, comics, which is a combination of illustrations and text, and the like. Examples of the audio content may include a piece of music and the like. The content may be the entirety or a part of a piece of work; as an example, the content may be a scene of a movie.

Examples of the content information that indicates the content may include data included in the content, such as visual data, voice data, text data, or image data, and data obtained by converting the format of one of these into another format. By way of example, without limitations to the present example embodiment, specific examples of the content information may include:

> text data that indicates the details of conversation between persons in a scene included in a drama program, which is the visual content; and > image data that indicates dialogue and illustrations of characters included in comics, which is the image content, over a plurality of pages.

(Content Emotion Information Generation Section 12)

The content emotion information generation section 12 generates, with reference to the content information, content emotion information that indicates an emotion related to the content. As an example, the content emotion information generation section 12 may employ a configuration in which:

> the content information is referred to; and

> based on the content information and a predetermined algorithm, tabular data is generated as the content emotion information, the tabular data including one or more types of emotions determined in advance and the strength of each emotion estimated to be held by a user to which the content is provided, associated with each other for each type of the emotions.

Here, examples of the types of emotions may include happiness, sadness, fear, love, anger, acceptance, anxiety, absent-mindedness, sorrow, regret, contempt, irritation, optimism, and the like. In the content emotion information, each type of emotions may be indicated by, for example, the name of the type of the emotion or an attribute label corresponding thereto. Further, in the content emotion information, the strength of each emotion may be indicated by, for example, the numerical value or the rank that indicates the strength of the emotion.

Here, in a case where the text data is referred to as the content information, the predetermined algorithm may employ, for example, a configuration in which:

> it is determined, for each type of emotions, whether or not each of one or more words previously associated with the emotion is included in the referred text data; and > the number of words included in the text data is generated as the numerical value that indicates the strength of the emotion of the type that has been associated with the words.

The predetermined algorithm may be, for example, a trained model trained by performing machine learning, by inputting the content information that is one of the visual data, the audio data, the text data, and the image data, to generate the content emotion information that indicates an emotion related to the content.

(Foodstuff Information Output Section 13)

The foodstuff information output section 13 outputs, with reference to the content emotion information and foodstuff emotion information that indicates emotions related to respective foodstuffs included in a foodstuff group, foodstuff information that indicates one or more foodstuffs from the foodstuff group, the one or more foodstuffs being related to an emotion correlating with the emotion indicated by the content emotion information.

Here, as an example, the foodstuff group may be a group including predetermined multiple types of foodstuffs. As an example, the foodstuff emotion information may be tabular data in which one or more types of emotions included in the content emotion information and the strength of each emotion estimated to be caused to a user by a foodstuff included in the foodstuff group are associated with each other for each type of foodstuffs in the foodstuff group.

As an example, the foodstuff information output section 13 may employ a configuration in which:

the foodstuff emotion information and the content emotion information are referred to;

for each type of foodstuffs included in the foodstuff emotion information, the degree of correlation between the foodstuff emotion information and the content emotion information is determined in terms of the types and the strengths of the emotions;

data that indicates the type of a foodstuff having the degree of correlation determined of not less than a predetermined threshold is generated as the foodstuff information; and the generated foodstuff information is outputted.

In a case where such a configuration is employed, a developer of a food product who uses the foodstuff information can efficiently perform foodstuff selection by considering a foodstuff indicated by the foodstuff information as a foodstuff for a content-themed food product.

As another example, the foodstuff information output section 13 may employ a configuration in which:

the foodstuff emotion information and the content emotion information are referred to;

for each type of foodstuffs included in the foodstuff emotion information, the degree of correlation between the foodstuff emotion information and the content emotion information is determined in terms of the types and the strengths of the emotions;

data that indicates the degree of correlation determined for each of all types of foodstuffs included in the foodstuff group is generated as the foodstuff information; and the generated foodstuff information is outputted.

In a case where such a configuration is employed, a developer of a food product who uses the foodstuff information can efficiently perform foodstuff selection by considering foodstuffs included in the foodstuff group in a descending order of the degree of correlation, as a foodstuff for a content-themed food product.

(Example Advantage of Information Processing Apparatus 1)

As described in the foregoing, the information processing apparatus 1 employs a configuration in which:

content information that indicates content is obtained;

content emotion information that indicates an emotion related to the content is generated with reference to the content information; and with reference to the content emotion information and foodstuff emotion information that indicates emotions related to respective foodstuffs included in a foodstuff group, foodstuff information that indicates one or more foodstuffs from the foodstuff group is outputted, the one or more foodstuffs being related to an emotion correlating with the emotion indicated by the content emotion information.

Therefore, the information processing apparatus 1 with this configuration outputs, with reference to the content information that indicates the content, the foodstuff information that indicates one or more foodstuffs related to an emotion correlating with the emotion related to the content. Since each foodstuff indicated by the outputted foodstuff information is related to the emotion correlating with the emotion related to the content, the foodstuff is suitable for an ingredient of a content-themed food product. Therefore, with this configuration, it is possible to provide a technique for proposing a foodstuff suitable for a content-themed food product based on the information about the content.

(Flow of Information Processing Method S1)

Figure 2:
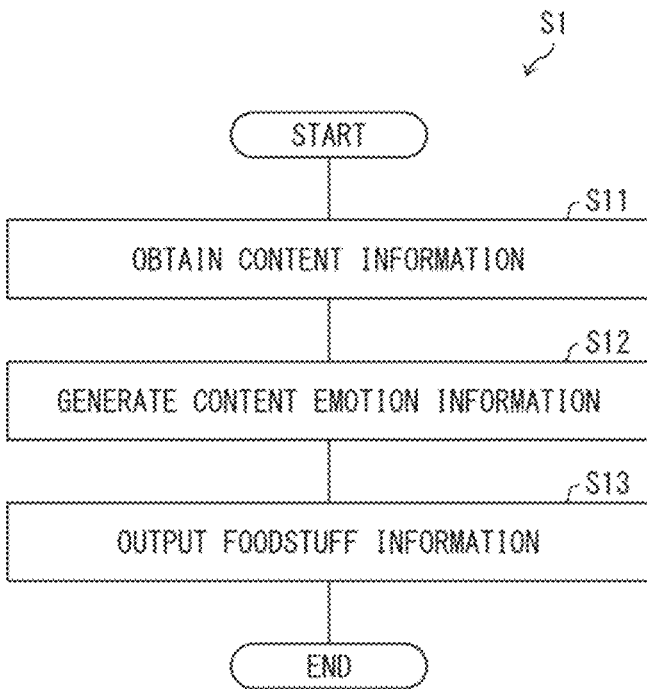
FIG. 2 is a flowchart illustrating the flow of an information processing method in accordance with the present disclosure.

Next, the following description will discuss the flow of an information processing method S1 in accordance with the present example embodiment with reference to FIG. 2. FIG. 2 is a flowchart illustrating the flow of the information processing method S1. As illustrated in FIG. 2, the information processing method S1 includes a step (process) S11 of obtaining the content information, a step (process) S12 of generating the content emotion information, and a step (process) S13 of outputting the foodstuff information.

(Step S11)

In step S11, the content information obtaining section 11 obtains content information that indicates content. Since the specific process carried out by the content information obtaining section 11 is described above, a description thereof is omitted here.

(Step S12)

In step S12, the content emotion information generation section 12 generates, with reference to the content information, content emotion information that indicates an emotion related to the content. Since the specific process carried out by the content emotion information generation section 12 is described above, a description thereof is omitted here.

(Step S13)

In step S13, the foodstuff information output section 13 outputs, with reference to the content emotion information and foodstuff emotion information that indicates emotions related to respective foodstuffs included in a foodstuff group, foodstuff information that indicates one or more foodstuffs from the foodstuff group, the one or more foodstuffs being related to an emotion correlating with the emotion indicated by the content emotion information. Since the specific process carried out by the foodstuff information output section 13 is described above, a description thereof is omitted here.

(Example Advantage of Information Processing Method S1)

As described in the foregoing, the information processing method S1 employs a configuration including:

obtaining content information that indicates content;

generating, with reference to the content information, content emotion information that indicates an emotion related to the content; and outputting, with reference to the content emotion information and foodstuff emotion information that indicates emotions related to respective foodstuffs included in a foodstuff group, foodstuff information that indicates one or more foodstuffs from the foodstuff group, the one or more foodstuffs being related to an emotion correlating with the emotion indicated by the content emotion information.

Therefore, the information processing method S1 with this configuration outputs, with reference to the content information that indicates the content, the foodstuff information that indicates one or more foodstuffs related to an emotion correlating with the emotion related to the content. Since each foodstuff indicated by the outputted foodstuff information is related to the emotion correlating with the emotion related to the content, the foodstuff is suitable for an ingredient of a content-themed food product. Therefore, with this configuration, it is possible to provide a technique for proposing a foodstuff suitable for a content-themed food product based on the information about the content.

Second Example Embodiment

A second example embodiment, which is an example of the embodiment of the present invention, will be described in detail with reference to the drawings. The same reference symbols are given to constituent elements which have functions identical to those described in the above example embodiment, and descriptions as to such constituent elements are omitted as appropriate. It should be noted that the scope of an application of technical means employed in the present example embodiment is not limited to the present example embodiment. That is, each technical means employed in the present example embodiment can be employed also in another example embodiment included in the present disclosure, provided that no particular technical problems occur. In addition, each technical means illustrated in each drawing referred to for discussing the present example embodiment can be employed also in another example embodiment included in the present disclosure, provided that no particular technical problems occur.
(Configuration of Information Processing Apparatus 1A)

Figure 3:
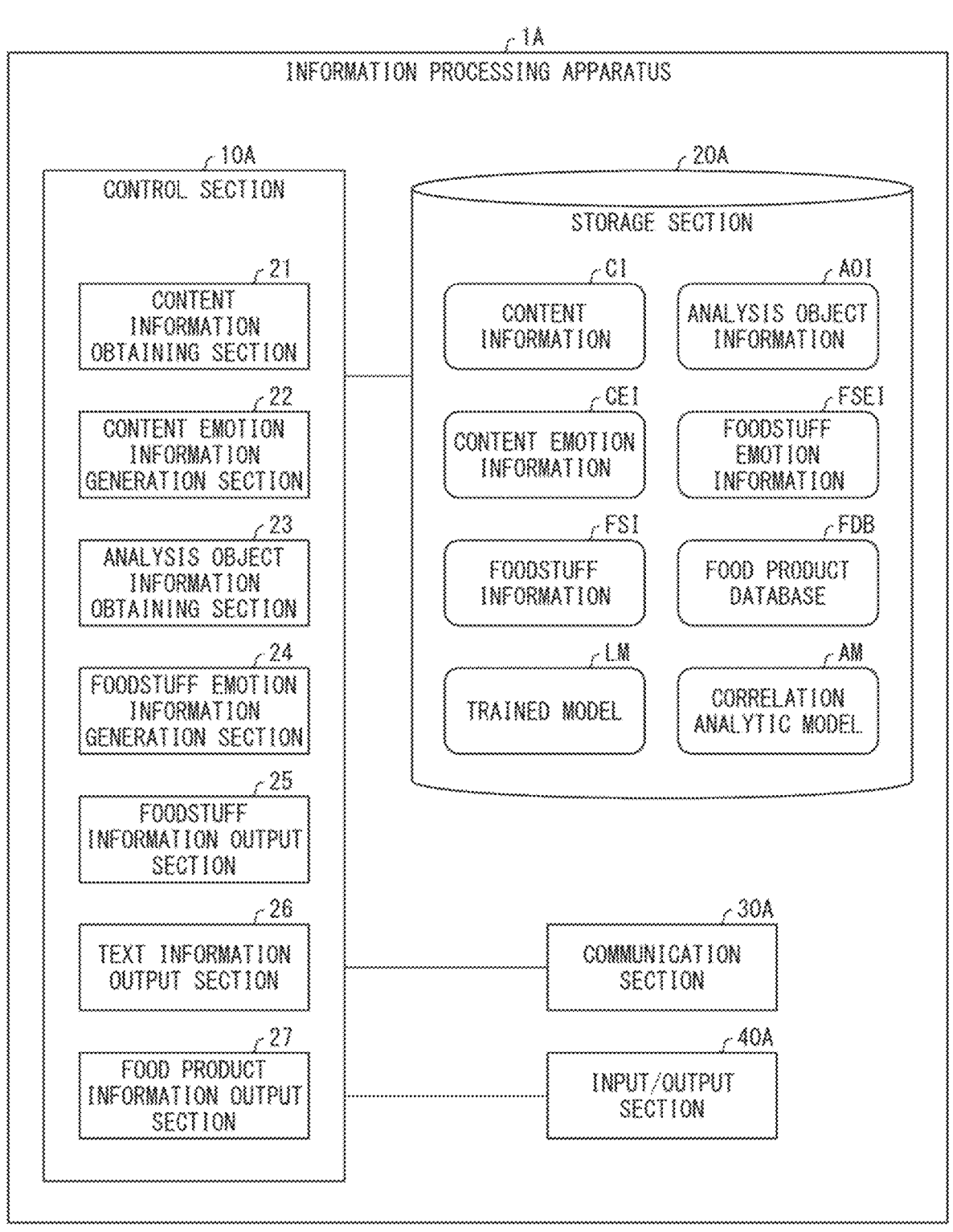
FIG. 3 is a block diagram illustrating the configuration of an information processing apparatus in accordance with the present disclosure.

The following description will discuss the configuration of an information processing apparatus 1A in accordance with the present example embodiment with reference to FIG. 3. FIG. 3 is a block diagram illustrating the configuration of the information processing apparatus 1A. As illustrated in FIG. 3, the information processing apparatus 1A includes a control section 10A, a storage section 20A, a communication section 30A, and an input/output section 40A.
(Communication Section 30A)

The communication section 30A communicates with an apparatus external to the information processing apparatus 1A via a network. For example, the communication section 30A may transmit data provided from the control section 10A to an external apparatus and provide data received from an external apparatus to the control section 10A. It should be understood that the present example embodiment is not limited by any specific configurations of the network set forth herein, and examples of the network may include a wireless local area network (LAN), a wired LAN, a wide area network (WAN), a public network, a mobile data communication network, and a combination of these networks.
(Input/Output Section 40A)

The input/output section 40A is configured to include at least one of input/output apparatuses such as a keyboard, a mouse, a display, a printer, and a touch panel. Alternatively, it may be configured so that an input/output apparatus such as a keyboard, a mouse, a display, a printer, or a touch panel, may be connected to the input/output section 40A. In this configuration, the input/output section 40A receives input of various kinds of information to the information processing apparatus 1A from a connected input apparatus. Further, the input/output section 40A outputs various kinds of information to an output apparatus connected thereto, under the control of the control section 10A. Examples of the input/output section 40A may include an interface such as universal serial bus (USB).
(Storage Section 20A)

The storage section 20A stores various kinds of data referred to by the control section 10A and various kinds of data generated by the control section 10A. As an example, the storage section 20A may include the following:
content information CI;
analysis object information AOI;
content emotion information CEI;
foodstuff emotion information FSEI;
foodstuff information FSI;
trained model LM;
correlation analytic model AM; and
food product database FDB.

Here, the content information CI is data obtained by a content information obtaining section 21, which will be described later. A specific example of the content information CI will be described later. The analysis object information AOI is data obtained by an analysis object information obtaining section 23, which will be described later. A specific example of the analysis object information AOI will be described later.

The content emotion information CEI is data generated by a content emotion information generation section 22, which will be described later. A specific example of the content emotion information CEI will be described later. The foodstuff emotion information FSEI is data generated by a foodstuff emotion information generation section 24, which will be described later. A specific example of the foodstuff emotion information FSEI will be described later. The foodstuff information FSI is data generated by a foodstuff information output section 25, which will be described later. A specific example of the foodstuff information FSI will be described later.

The trained model LM is a model trained in advance by performing machine learning, and is a scoring model referred to by the content emotion information generation section 22 and the foodstuff emotion information generation section 24, which will be described later. The storage section 20A stores various programs and parameters that form the trained model LM. A specific example of the trained model LM will be described later.

The correlation analytic model AM is an analytic model referred to by the foodstuff information output section 25, which will be described later. The storage section 20A stores various programs and parameters that form the correlation analytic model AM. A specific example of the correlation analytic model AM will be described later.

The food product database FDB is a database referred to by a food product information output section 27, which will be described later. A specific example of the food product database FDB will be described later.
(Control Section 10A)

As illustrated in FIG. 3, the control section 10A includes the content information obtaining section 21, the content emotion information generation section 22, the analysis object information obtaining section 23, the foodstuff emotion information generation section 24, the foodstuff information output section 25, a text information output section 26, and the food product information output section 27.
(Content Information Obtaining Section 21)

The content information obtaining section 21 obtains content information CI that indicates content. Here, examples of the content may include visual content, text content, image content, audio content, and a part of any of these types of content. Examples of the visual content may include a movie, a television program, such as a drama program or a documentary program, and the like. Examples of the text content may include a novel, an essay, and the like. Examples of the image content may include an illustration, a photograph, comics, which is a combination of illustrations and text, and the like. Examples of the audio content may include a piece of music and the like. The content may be the entirety or a part of a piece of work; as an example, the content may be a scene of a movie.

Examples of the content information CI that indicates the content may include data included in the content, such as visual data, voice data, text data, or image data, and data obtained by converting the format of one of these into another format. By way of example, without limitations to the present example embodiment, specific examples of the content information CI may include:

text data that indicates the details of conversation between persons in a scene included in a drama program, which is the visual content; and image data that indicates dialogue and illustrations of characters included in comics, which is the image content, over a plurality of pages.

For example, the content information CI obtained by the content information obtaining section 21 may be stored in the storage section 20A, and may be referred to by the content emotion information generation section 22 or the like.

(Content Emotion Information Generation Section 22)

The content emotion information generation section 22 generates, with reference to the content information CI, content emotion information CEI that indicates an emotion related to the content. As an example, the content emotion information generation section 22 may employ a configuration in which:

the content information CI is referred to; and the content information CI is inputted into the trained model LM, to generate the content emotion information CEI.

Here, as an example, the content emotion information CEI generated may be information in which the type of the emotion related to the content and the strength of the emotion are associated with each other. Here, the content emotion information CEI may employ a configuration in which one or more types of emotions are determined to be employed in advance and the strength of each emotion is associated for each of the types of the emotions. Here, examples of the types of emotions may include happiness, sadness, fear, love, anger, acceptance, anxiety, absent-mindedness, sorrow, regret, contempt, irritation, optimism, and the like. In the content emotion information CEI, each type of emotions may be indicated by, for example, the name of the type of the emotion or an attribute label corresponding thereto. Further, in the content emotion information CEI, the strength of each emotion may be indicated by, for example, the numerical value or the rank that indicates the strength of the emotion.

Here, the trained model LM may be, for example, a model trained by performing machine learning, by inputting the content information CI that is one of the visual data, the audio data, the text data, and the image data, to generate the content emotion information CEI that indicates an emotion related to the content. By way of example, without limitations to the present example embodiment, the trained model LM may employ a configuration in which the trained model LM:

receives the text data, which is the content information CI, as input;

extracts, from the inputted text data, a word having a high correlation with any of the types of the emotions;

determines a numerical value that indicates the strength of the emotion of this type, based on the extracted word and the feature determined in advance to the extracted word; and generates, as the content emotion information CEI, tabular data in which the types of the emotions and the numerical value determined for each of the types of the emotions are associated with each other.

For example, the analysis object information AOI generated by the content emotion information generation section 22 may be stored in the storage section 20A, and may be referred to by the foodstuff information output section 25, the text information output section 26, or the like.

(Analysis Object Information Obtaining Section 23)

The analysis object information obtaining section 23 obtains the analysis object information AOI that indicates a foodstuff and an emotion associated with the foodstuff. Here, as an example, the analysis object information AOI may be information that indicates content and includes information that indicates a foodstuff in a part thereof. Here, as an example, the content may employ data of the same type as that described regarding the content information CI, and the description thereof is not repeated. By way of example, without limitations to the present example embodiment, specific examples of the analysis object information AOI may include:

voice data that indicates a music piece;

text data that indicates the lyrics of a music piece; and image data that indicates comics.

For example, the analysis object information AOI obtained by the analysis object information obtaining section 23 may be stored in the storage section 20A, and may be referred to by the foodstuff emotion information generation section 24 or the like.

(Foodstuff Emotion Information Generation Section 24)

The foodstuff emotion information generation section 24 inputs, into the trained model LM, the analysis object information AOI that indicates a foodstuff and an emotion associated with the foodstuff, to generate the foodstuff emotion information FSEI that indicates the emotion associated with the foodstuff. As an example, the foodstuff emotion information generation section 24 may employ a configuration in which:

the content information CI is referred to; and inputting the analysis object information AOI into the trained model LM to generate the foodstuff emotion information FSEI.

Here, the trained model LM may be, as an example, a model trained by performing machine learning to receive as input the analysis object information AOI that is one of visual data, audio data, text data, and image data, to generate the foodstuff emotion information FSEI that indicates an emotion related to the foodstuff. By way of example, without limitations to the present example embodiment, the trained model LM may employ a configuration in which the trained model LM:

receives, as input, text data that indicates the lyrics of a piece of music, which is the analysis object information AOI;

extracts, from the inputted text data, a first word that indicates a foodstuff name, and a second word that is proximate to the first word and has a high correlation with any of the types of the emotions;

determines a numerical value that indicates the strength of the emotion of this type, based on the second word and the feature determined in advance to the second word; and generates, as the foodstuff emotion information FSEI, tabular data in which (i) a foodstuff group that includes multiple types of foodstuffs each corresponding to the first word, (ii) the types of the emotions, and (iii) the numerical value determined for each of the types of the emotions are associated with each other.

By way of example, without limitations to the present example embodiment, the set of the types of the emotions included in the foodstuff emotion information FSEI and the set of the types of the emotions included in the content emotion information CEI may be identical to each other.

As an example, the foodstuff emotion information FSEI generated may be information that indicates emotions related to respective foodstuffs included in the foodstuff group. Alternatively, as an example, the foodstuff emotion information FSEI may be information in which the type of the emotion related to the foodstuff and the strength of the emotion are associated with each other. The foodstuff emotion information FSEI generated may employ a configuration in which one or more types of emotions are determined to be employed in advance by the trained model LM, and the strength of each emotion is associated for each of the foodstuffs and for each of the types of the emotions. Here, in the foodstuff emotion information FSEI, each type of emotions may be indicated by, for example, the name of the type of the emotion or an attribute label corresponding thereto. Further, in the foodstuff emotion information FSEI, the strength of each emotion may be indicated by, for example, the numerical value or the rank that indicates the strength of the emotion.

As an example, the foodstuff group may be a set of one or more types of foodstuffs indicated by the analysis object information AOI. By way of example, without limitations to the present example embodiment, if the analysis object information AOI is text data including the names of two kinds of foodstuffs, "apple" and "lemon", the foodstuff group may be a set including apple and lemon.

For example, the foodstuff emotion information FSEI generated by the foodstuff emotion information generation section 24 may be stored in the storage section 20A, and may be referred to by the foodstuff information output section 25 or the like.

(Foodstuff Information Output Section 25)

The foodstuff information output section 25 outputs, with reference to the content emotion information CEI and foodstuff emotion information FSEI that indicates emotions related to respective foodstuffs included in a foodstuff group, foodstuff information FSI that indicates one or more foodstuffs from the foodstuff group, the one or more foodstuffs being related to an emotion correlating with the emotion indicated by the content emotion information CEI. Here, the foodstuff information output section 25 may employ a configuration in which the foodstuff information FSI is outputted based on a correlation between the type and the strength of the emotion indicated by the content emotion information CEI, and the type and the strength of the emotion indicated by the foodstuff emotion information FSEI.

As an example, the foodstuff information output section 25 may employ a configuration in which:

the foodstuff emotion information FSEI and the content information CEI are referred to;

the foodstuff emotion information FSEI and the content emotion information CEI are inputted into the correlation analytic model AM, to generate the foodstuff information FSI; and the generated foodstuff information FSI is outputted to the input/output section 40A.

An example of the process carried out by the foodstuff information output section 25 with use of the correlation analytic model AM will be described later with reference to another drawing.

For example, the foodstuff information FSI outputted or generated by the foodstuff information output section 25 may be stored in the storage section 20A, and may be referred to by the text information output section 26, the food product information output section 27, or the like.

(Text Information Output Section 26)

The text information output section 26 outputs, with reference to the content emotion information CEI and the foodstuff information FSI, text information TI that indicates text in which the emotion indicated by the content emotion information CEI and the foodstuff indicated by the foodstuff information FSI are associated with each other. Here, as an example, the text information TI outputted may be information that causes a user who is provided with the text indicated by the text information TI to think of the emotion indicated by the content emotion information CEI and the foodstuff indicated by the FSI.

Here, as an example, the text information output section 26 may employ a configuration in which:

the strongest emotion is selected from among one or more types of emotions indicated by the content emotion information CEI referred to;

a word associated with the selected emotion is generated;

a word associated with a foodstuff indicated by the foodstuff information FSI referred to is generated;

text data that indicates text including the generated word associated with the emotion and the generated word associated with the foodstuff is generated as text information TI; and the generated text information TI is outputted to the input/output section 40A.

As an example, the text information output section 26 may employ a configuration in which the content information CI is referred to in addition to the content emotion information CEI. In a case where this configuration is employed, the text information output section 26 may be, for example, configured to output the text information TI that indicates text in which the content indicated by the content information CI, the emotion indicated by the content emotion information CEI, and the foodstuff indicated by the foodstuff information FSI are associated with each other. In this case, as an example, the text information TI outputted may be information causing a user who is provided with the text indicated by the text information TI to think of the content indicated by the content information CI, the emotion indicated by the content emotion information CEI, and the foodstuff indicated by the FSI.

As an example, the text information output section 26 may employ a configuration in which the content information CI is referred to instead of the content emotion information CEI. In a case where this configuration is employed, the text information output section 26 may be, for example, configured to output the text information TI that indicates text in which the content indicated by the content information CI and the foodstuff indicated by the foodstuff information FSI are associated with each other. In this case, as an example, the text information TI outputted may be information causing a user who is provided with the text indicated by the text information TI to think of the content indicated by the content information CI and the foodstuff indicated by the FSI.

For example, the text information TI outputted or generated by the text information output section 26 may be stored in the storage section 20A.

(Food Product Information Output Section 27)

The food product information output section 27 outputs, with reference to the foodstuff information FSI, either or both of (1) food product information FI that indicates a food product including at least one of the foodstuffs indicated by the foodstuff information FSI and (2) advisory information ADI including the food product information FI and adapted to assist a user to make a decision. For example, the food product information FI outputted may be information that indicates a food product including a raw material derived from a foodstuff indicated by the foodstuff information FSI as any of a flavor, a topping, and a colorant. Here, the food product information FI may be, for example, text data or image data that indicates a food product. The food product indicated by the food product information FI may be a product that is eaten alone, such as bread, or may be a product that is eaten together with another food product, such as a rice seasoning, or furikake.

As an example, the advisory information ADI may be information that indicates information about a food product indicated by the food product information FI included in the advisory information ADI. Here, the information about a food product may be, for example, information that indicates nutrients of the food product.

As an example, the food product information output section 27 may employ a configuration in which:

the foodstuff information FSI is referred to;

the food product database FDB in which predetermined multiple types of food products and foodstuffs included in each of the food products are associated with each other is searched for a food product including a foodstuff indicated by the foodstuff information FSI;

information that indicates the extracted food product is generated as food product information FI; and the generated food product information FI is outputted to the input/output section 40A.

For example, the food product information FI and the advisory information ADI outputted or generated by the food product information output section 27 may be stored in the storage section 20A.

(Flow of Processing Carried Out by Information Processing Apparatus 1A)

Figure 4:
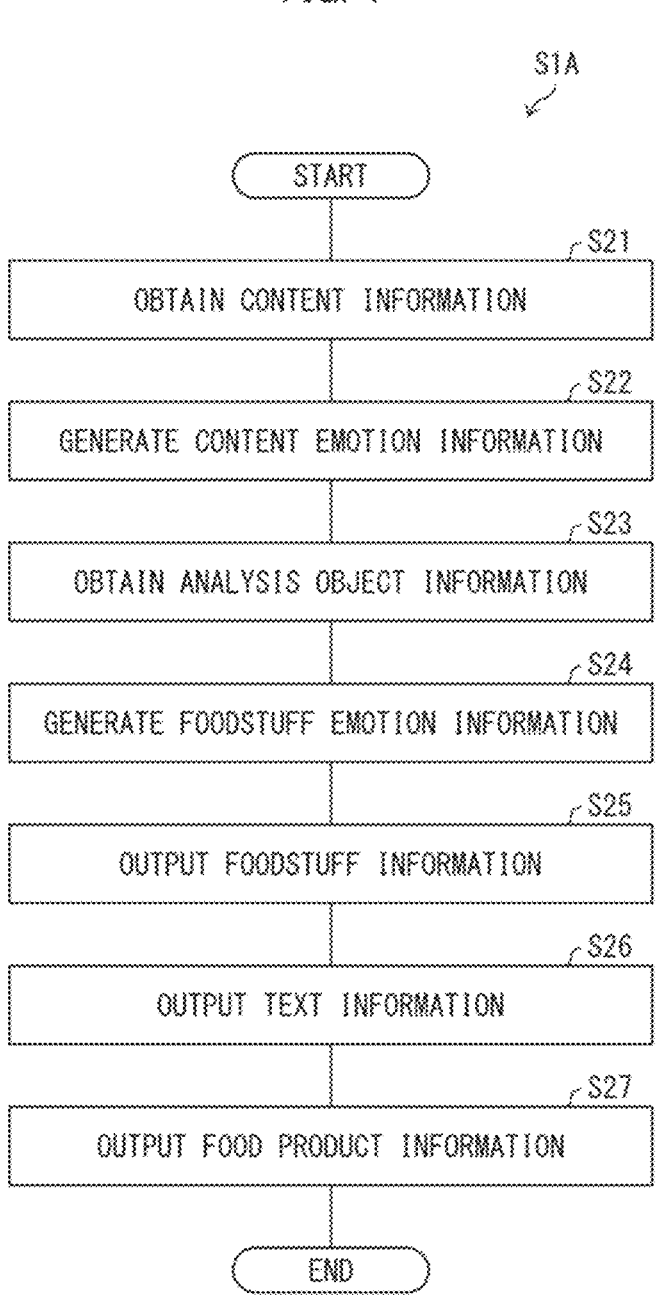
FIG. 4 is a flowchart illustrating an example of the flow of processing carried out by the information processing apparatus in accordance with the present disclosure.
Figure 5:
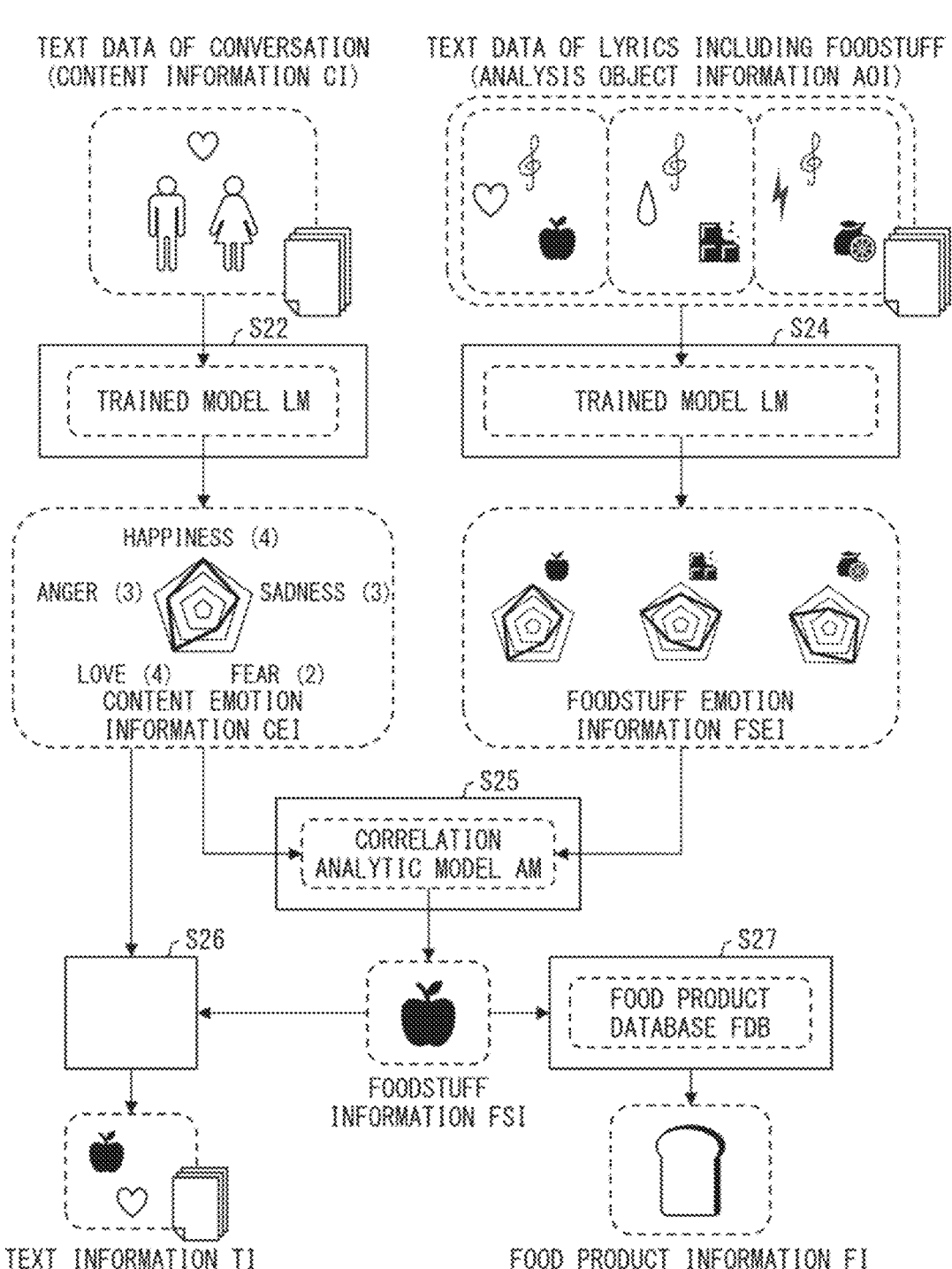
FIG. 5 is a diagram for describing an example of processing carried out by the information processing apparatus in accordance with the present disclosure.

Next, the flow of the processing carried out by the information processing apparatus 1A will be described with reference to FIGS. 4 and 5. FIG. 4 is a flowchart illustrating an example of the flow of the processing carried out by the information processing apparatus 1A. FIG. 5 is a diagram for describing an example of the processing carried out by the information processing apparatus 1A.

As illustrated in FIG. 4, an information processing method S1A includes: a step (process) S21 of obtaining the content information CI; a step (process) S22 of generating the content emotion information CEI; a step (process) S23 of obtaining the analysis object information AOI; a step (process) S24 of generating the foodstuff emotion information FSEI; a step (process) S25 of outputting the foodstuff information; a step (process) S26 of outputting the text information; and a step (process) S27 of outputting the food product information.

(Step S21)

In step S21, the content information obtaining section 21 obtains the content information CI. Since the specific process carried out by the content information obtaining section 21 is described above, a description thereof is omitted here.

(Step S22)

In step S22, the content emotion information generation section 22 generates the content emotion information CEI. In the example illustrated in FIG. 5, the content emotion information generation section 22 refers to the content information CI, inputs the content information CI into the trained model LM, and generates the content emotion information CEI. Since the specific process carried out by the trained model LM is described above, a description thereof is omitted here.

In the example illustrated in FIG. 5, as the content information CI referred to, employed is text data that indicates the details of conversation between a man and a woman in a scene depicting the their romance and included in a drama program, which is the visual content. As the content emotion information CEI generated, employed is data that indicates, for each of five predetermined types of emotions, the strength of the emotion with use of a numerical value for each type of the emotion.

(Step S23)

In step S23, the analysis object information obtaining section 23 obtains analysis object information AOI. Since the specific process carried out by the analysis object information obtaining section 23 is described above, a description thereof is omitted here.

(Step S24)

In step S24, the foodstuff emotion information generation section 24 generates the foodstuff emotion information FSEI. In the example illustrated in FIG. 5, the foodstuff emotion information generation section 24 refers to the analysis object information AOI, inputs the analysis object information AOI into the trained model LM, and generates the foodstuff emotion information FSEI. Since the specific process carried out by the trained model LM is described above, a description thereof is omitted here.

In the example illustrated in FIG. 5, as the analysis object information AOI referred to, employed is text data that indicates lyrics of multiple pieces of music, the lyrics each including a word indicating the name of a foodstuff. In the example illustrated in FIG. 5, the text data indicates (1) lyrics expressing love in combination with apple, (2) lyrics expressing heartbreak in combination with chocolate, and (3) lyrics expressing jealousy in combination with lemon. As the foodstuff emotion information FSEI generated, employed is data that indicates, for each of five predetermined types of emotions, the strength of the emotion with use of a numerical value for each foodstuff and for each type of the emotion. In the example illustrated in FIG. 5, generated is the foodstuff emotion information FSEI that indicates the strengths of the emotions of various kinds by use of numerical values for each of apple, chocolate, and lemon.

(Step S25)

In step S25, the foodstuff information output section 25 generates the foodstuff emotion information FSEI. In the example illustrated in FIG. 5, the foodstuff information output section 25 refers to the foodstuff emotion information FSEI and the content emotion information CEI, inputs the foodstuff emotion information FSEI and the content emotion information CEI into the correlation analytic model AM, generates the foodstuff information FSI, and outputs the generated foodstuff information FSI to the input/output section 40A. Since the specific process carried out by the correlation analytic model AM is described above, a description thereof is omitted here.

In the example illustrated in FIG. 5, as the foodstuff information FSI outputted, data that indicates the name of a foodstuff is employed. In the example illustrated in FIG. 5, the outputted foodstuff information FSI is data that indicates the foodstuff of "apple".
(Step S26)

In step S26, the text information output section 26 generates the text information TI. In the example illustrated in FIG. 5, the text information output section 26 outputs, with reference to the content emotion information CEI and the foodstuff information FSI, the text information TI that indicates text in which the emotion indicated by the content emotion information CEI is associated with the foodstuff indicated by the foodstuff information FSI.

In the example illustrated in FIG. 5, as the text information TI outputted, employed is text data that indicates text including a word associated with the emotion and a word associated with the foodstuff. In the example illustrated in FIG. 5, the text information TI outputted is text data including a word related to a romantic relationship and a word "apple".
(Step S27)

In step S27, the food product information output section 27 generates the food product information FI. In the example illustrated in FIG. 5, the food product information output section 27 outputs, with reference to the foodstuff information FSI, either or both of (1) food product information FI that indicates a food product including at least one of the one or more foodstuffs indicated by the foodstuff information FSI and (2) advisory information ADI including the food product information FI and adapted to assist a user to make a decision. Here, the food product information output section 27 searches, for a food product including a foodstuff indicated by foodstuff information FSI, the food product database FDB in which predetermined multiple types of food products and foodstuffs included in each of the food products are associated with each other, and then, the food product information output section 27 generates and outputs the information that indicates the extracted food product as the food product information FI. Further, as an example, the food product information output section 27 may generate and output, as the advisory information ADI, information that is included in the food product database FDB, is associated with the extracted food product, and is adapted to assist a user to make a decision, in combination of the food product information FI.

In the example illustrated in FIG. 5, as the food product information FI outputted, data that indicates a food product is employed. In the example illustrated in FIG. 5, the outputted food product information FI is a slice of bread including apple as an ingredient.
(Example Process Carried Out by Foodstuff Information Output Section 25)

Next, an example process carried out by the foodstuff information output section 25 will be described with reference to FIG. 6. FIG. 6 is a diagram for describing an example of processing carried out by the foodstuff information output section 25.

As an example, the content emotion information CEI may be information in which a type of the emotion related to the content and a strength of the emotion are associated with each other. In the example illustrated in FIG. 6, the content emotion information CEI is tabular data in which the strength of each emotion expressed numerically are associated with the type of the emotion. As illustrated in FIG. 6, in the content emotion information CEI, "type of emotion: strength of emotion" associated with the content is "happiness:4", "sadness:3", "fear:2", "love:4", and "anger:3".

As an example, the foodstuff emotion information FSEI may be information in which a type of each of the emotions related to each foodstuff and a strength of the emotion are associated with each other. In the example illustrated in FIG. 6, the foodstuff emotion information FSEI is tabular data in which the strength of each emotion is expressed numerically for each foodstuff included in the foodstuff group and for each of the types of the emotions. As illustrated in FIG. 6, in the foodstuff emotion information FSEI, "type of emotion:strength of emotion" associated with the foodstuff "apple" is "happiness:4", "sadness:3", "fear:2", "love:4", and "anger:3". In the foodstuff emotion information FSEI, the foodstuffs "lemon", "chocolate", "peanuts", "soda", and "coffee" are similarly associated.

As an example, the foodstuff information output section 25 may output the foodstuff information FSI based on a correlation between the type and the strength of the emotion indicated by the content emotion information CEI, and the type and the strength of the emotion indicated by the foodstuff emotion information FSEI. In the example illustrated in FIG. 6, the foodstuff information output section 25 can employ a configuration in which:

the foodstuff emotion information FSEI and the content emotion information CEI are referred to;

the foodstuff emotion information FSEI and the content emotion information CEI are inputted into the correlation analytic model AM, to generate the foodstuff information FSI; and the generated foodstuff information FSI is outputted to the input/output section 40A.

Here, the correlation analytic model AM may employ a configuration in which:

for each foodstuff included in the foodstuff group, a correlative score that indicates the degree of correlation between the strength of the emotion in the content emotion information CEI and the strength of the emotion in the foodstuff emotion information FSEI is calculated;

the calculated correlative score is compared with a threshold determined in advance by the correlation analytic model AM for each foodstuff included in the foodstuff group; and information that indicates the foodstuff for which the correlative score that is equal to or more than the threshold value is calculated is generated as the foodstuff information FSI.

Here, the foodstuff information FSI may be, as an example, serial data that indicates foodstuffs by arranging the foodstuffs in descending order of correlative score. An example of the correlative score may be a correlation coefficient.

As illustrated in FIG. 6, the correlation analytic model AM calculates, with reference to "type of emotion:strength of emotion" associated with the content and "type of emotion:strength of emotion" associated with the foodstuff "apple", the correlative score of "4" for the foodstuff "apple". Next, the correlation analytic model AM compares the correlative score of "4" calculated for the foodstuff "apple" with the threshold of "3" determined in advance for the foodstuff "apple", and determines that the correlative score is not less than the threshold. Similarly, the correlation analytic model AM carries out the same process to foodstuffs other than "apple". The foodstuff information output section 25 arranges, in ascending order of correlative score of foodstuff, the foodstuffs "apple" and "soda" each being determined to have the correlative score not less than the threshold in the correlation analytic model AM, to generate the foodstuff information FSI in which the association of "rank:foodstuff" is established to be "1:apple" and "2:soda".

As an example, the foodstuff information output section 25 may generate, as the foodstuff information FSI, data that indicates a correlative score calculated by the correlation analytic model AM for each foodstuff. In this case, the foodstuff information output section 25 generates the foodstuff information FSI in which the association of "foodstuff: correlative score" is established to be "apple:4", "lemon:2", "chocolate:2", "peanuts:2", "soda:3", and "coffee:1".

(Example Advantages of Information Processing Apparatus 1A)

As described in the foregoing, the information processing apparatus 1A employs a configuration in which:

with reference to the content emotion information CEI and the foodstuff information FSI, the text information TI that indicates text in which the emotion indicated by the content emotion information CEI is associated with the foodstuffs indicated by the foodstuff information FSI is outputted.

Therefore, the information processing apparatus 1A with this configuration outputs the text information TI that indicates text in which the emotion indicated by the content emotion information CEI is associated with the foodstuffs indicated by the foodstuff information FSI. The text indicated by the text information TI can cause the user to think of an emotion correlating with the emotion related to the content, and can cause the user to think of a foodstuff indicated by the foodstuff information FSI. Therefore, with this configuration, the information processing apparatus 1A can output the text information TI that indicates text that can be suitably used to describe, to the user, the food product that is a content-themed food product and includes a foodstuff indicated by the foodstuff information FSI.

Further, the information processing apparatus 1A employs a configuration in which:

the analysis object information AOI that indicates a foodstuff and an emotion associated with the foodstuff is inputted into a trained model LM (model trained by performing machine learning), to generate the foodstuff emotion information FSEI that indicates the emotion related to the foodstuff.

Thus, the information processing apparatus 1A with this configuration generates the foodstuff emotion information FSEI referred to in order to output the foodstuff information FSI by using the trained model LM (model trained by performing machine learning). Therefore, with this configuration, it is possible to provide a technique for systematically analyzing the relevance between the content and the foodstuff by employing emotion as an element of the mediation information in the model trained by performing machine learning, so as to propose a foodstuff more suitable for a content-themed food product. Further, with this configuration, the information processing apparatus 1A can generate the foodstuff emotion information FSEI for more types of foodstuffs, so that it is possible to carry out a process of outputting the foodstuff information FSI including more types of foodstuffs as output candidates.

Further, the information processing apparatus 1A employs a configuration in which:

the content emotion information CEI is information in which a type of the emotion related to the content and a strength of the emotion are associated with each other;

the foodstuff emotion information FSEI is information in which a type of the emotion related to the foodstuff and a strength of the emotion are associated with each other; and the foodstuff information FSI is outputted based on a correlation between the type and the strength of the emotion indicated by the content emotion information CEI, and the type and the strength of the emotion indicated by the foodstuff emotion information FSEI.

Thus, the information processing apparatus 1A with this configuration outputs the foodstuff information FSI based on the correlation between the type and the strength of the emotion indicated by the content emotion information CEI, and the type and the strength of the emotion indicated by the foodstuff emotion information FSEI. Since the foodstuff indicated by the foodstuff information FSI outputted in this way is related to the emotion more strongly correlating with the emotion related to the content, this foodstuff is more suitable for an ingredient for a content-themed food product. Therefore, with this configuration, it is possible to provide a technique for proposing a foodstuff more suitable for a content-themed food product based on the information about the content.

Further, the information processing apparatus 1A employs a configuration in which:

with reference to the foodstuff information FSI, either or both of (1) food product information FI that indicates a food product including at least one of the foodstuffs indicated by the foodstuff information FSI and (2) advisory information ADI including the food product information FI and adapted to assist a user to make a decision is outputted.

Thus, the information processing apparatus 1A with this configuration outputs the food product information FI that indicates the food product including at least one foodstuff that is indicated by the foodstuff information FSI and is related to an emotion correlating with the emotion related to the content. The food product indicated by the outputted food product information FI is suitable for a content-themed food product of the content. Therefore, with this configuration, it is possible to provide a technique for proposing a food product suitable for a content-themed food product based on the information about the content.

Further, the information processing apparatus 1A employs a configuration in which:

the content information CI is text data.

Therefore, with this configuration, it is possible to provide a technique for proposing a foodstuff more suitable for a content-themed food product based on the content information CI, which is the text data.

[Software Implementation Example]

Some or all of functions of the information processing apparatuses 1 and 1A (hereinafter, also referred to as "the abovementioned apparatuses") may be realized by hardware such as an integrated circuit (IC chip) or may be alternatively realized by software.

Figure 7:
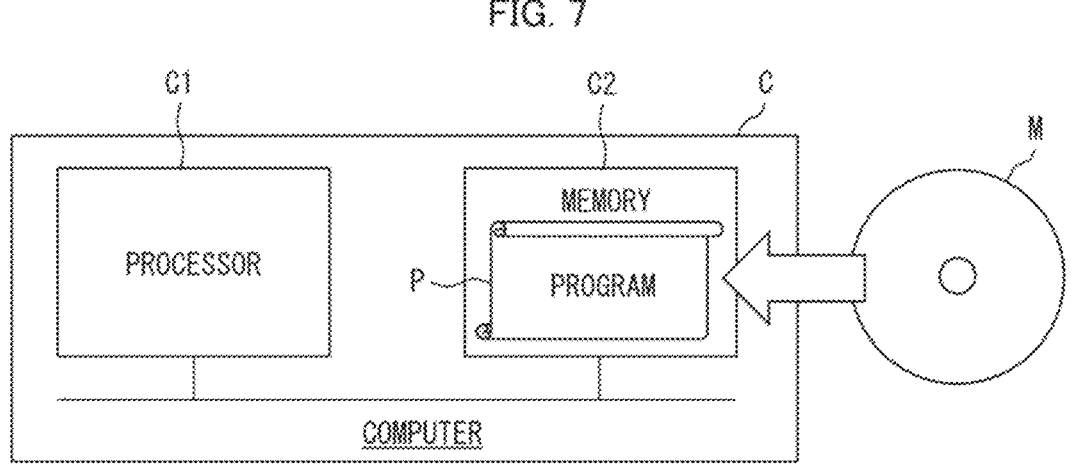
FIG. 7 is a block diagram illustrating the hardware configuration of an information processing apparatus in accordance with the present disclosure.

In the latter case, each of the abovementioned apparatuses is implemented by, for example, a computer that executes instructions of a program that is software implementing the functions. FIG. 7 illustrates an example of such a computer (hereinafter, referred to as "computer C"). FIG. 7 is a block diagram illustrating the hardware configuration of the computer C that functions as the abovementioned apparatuses.

The computer C includes at least one processor C1 and at least one memory C2. The memory C2 stores a program P for causing the computer C to function as the abovementioned apparatuses. The processor C1 of the computer C retrieves the program P from the memory C2 and executes the program P, so that the functions of the abovementioned apparatuses are implemented.

The processor C1 may be, for example, a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, or a combination thereof. The memory C2 can be, for example, a flash memory, a hard disk drive (HDD), a solid state drive (SSD), or a combination of these.

Note that the computer C may further include a random access memory (RAM) in which the program P is loaded if the program P is executed and/or in which various kinds of data are temporarily stored. The computer C may further include a communication interface via which data is transmitted to and received from another apparatus. The computer C may further include an input/output interface for connecting the computer C to an input/output apparatus(es) such as a keyboard, a mouse, a display and/or a printer.

The program P can be recorded in a non-transitory tangible storage medium M from which the computer C can read the program P. The storage medium M can be, for example, a tape, a disk, a card, a semiconductor memory, a programmable logic circuit, or the like. The computer C can acquire the program P via the storage medium M. The program P can be transmitted via a transmission medium. The transmission medium can be, for example, a communications network, a broadcast wave, or the like. The computer C can acquire the program P also via such a transmission medium.

[Additional Remark A]

The present disclosure includes techniques described in supplementary notes below. Note, however, that the present invention is not limited to the techniques described in supplementary notes below, but may be altered in various ways by a skilled person within the scope of the claims.

(Supplementary Note A1)

An information processing apparatus including:

content information obtaining means for obtaining content information that indicates content;

content emotion information generation means for generating, with reference to the content information, content emotion information that indicates an emotion related to the content; and foodstuff information output means for outputting, with reference to the content emotion information and foodstuff emotion information that indicates emotions related to respective foodstuffs included in a foodstuff group, foodstuff information that indicates one or more foodstuffs from the foodstuff group, the one or more foodstuffs being related to an emotion correlating with the emotion indicated by the content emotion information.

(Supplementary Note A2)

The information processing apparatus according to Supplementary note A1, further including text information output means for outputting, with reference to the content emotion information and the foodstuff information, text information that indicates text in which the emotion indicated by the content emotion information is associated with the one or more foodstuffs indicated by the foodstuff information.

(Supplementary Note A3)

The information processing apparatus according to Supplementary note A1 or A2, further including foodstuff emotion information generation means for inputting, into a model trained by performing machine learning, analysis object information that indicates a foodstuff and an emotion associated with the foodstuff, to generate the foodstuff emotion information that indicates the emotions related to the respective foodstuffs.

(Supplementary Note A4)

The information processing apparatus according to any one of Supplementary notes A1 to A3, wherein the content emotion information is information in which a type of the emotion related to the content and a strength of the emotion are associated with each other, the foodstuff emotion information is information in which a type of each of the emotions related to the respective foodstuffs and a strength of the emotion are associated with each other, and the foodstuff information output means outputs the foodstuff information based on a correlation between the type and the strength of the emotion indicated by the content emotion information, and the type and the strength of the emotion indicated by the foodstuff emotion information.

(Supplementary Note A5)

The information processing apparatus according to any one of Supplementary notes A1 to A4, further including food product information output means for outputting, with reference to the foodstuff information, either or both of (i) food product information that indicates a food product including at least one of the one or more foodstuffs indicated by the foodstuff information and (ii) advisory information including the food product information and adapted to assist a user to make a decision.

(Supplementary Note A6)

The information processing apparatus according to any one of Supplementary notes A1 to A5, wherein the content information is text data.

[Additional Remark B]

The present disclosure includes techniques described in supplementary notes below. Note, however, that the present invention is not limited to the techniques described in supplementary notes below, but may be altered in various ways by a skilled person within the scope of the claims.

(Supplementary Note B1)

An information processing method including:

a content information obtaining process of obtaining, by at least one processor, content information that indicates content;

a content emotion information generation process of generating, by the at least one processor, with reference to the content information, content emotion information that indicates an emotion related to the content; and a foodstuff information output process of outputting, by the at least one processor, with reference to the content emotion information and foodstuff emotion information that indicates emotions related to respective foodstuffs included in a foodstuff group, foodstuff information that indicates one or more foodstuffs from the foodstuff group, the one or more foodstuffs being related to an emotion correlating with the emotion indicated by the content emotion information.

(Supplementary Note B2)

The information processing method according to Supplementary note B1, further including a text information output process of outputting, by the at least one processor, with reference to the content emotion information and the foodstuff information, text information that indicates text in which the emotion indicated by the content emotion information is associated with the one or more foodstuffs indicated by the foodstuff information.
(Supplementary Note B3)

The information processing method according to Supplementary note B1 or B2, further including a foodstuff emotion information generation process of inputting, by the at least one processor, into a model trained by performing machine learning, analysis object information that indicates a foodstuff and an emotion associated with the foodstuff, to generate the foodstuff emotion information that indicates the emotions related to the respective foodstuffs.
(Supplementary Note B4)

The information processing method according to any one of Supplementary notes B1 to B3, wherein the content emotion information is information in which a type of the emotion related to the content and a strength of the emotion are associated with each other, the foodstuff emotion information is information in which a type of each of the emotions related to the respective foodstuffs and a strength of the emotion are associated with each other, and in the foodstuff information output process, the at least one processor outputs the foodstuff information based on a correlation between the type and the strength of the emotion indicated by the content emotion information, and the type and the strength of the emotion indicated by the foodstuff emotion information.
(Supplementary Note B5)

The information processing method according to any one of Supplementary notes B1 to B4, further including a food product information output process of outputting, by the at least one processor, with reference to the foodstuff information, either or both of (i) food product information that indicates a food product including at least one of the one or more foodstuffs indicated by the foodstuff information and (ii) advisory information including the food product information and adapted to assist a user to make a decision.
(Supplementary Note B6)

The information processing method according to any one of Supplementary notes B1 to B5, wherein the content information is text data.
[Additional Remark C]

The present disclosure includes techniques described in supplementary notes below. Note, however, that the present invention is not limited to the techniques described in supplementary notes below, but may be altered in various ways by a skilled person within the scope of the claims.
(Supplementary Note C1)

An information processing program for causing a computer to function as an information processing apparatus, the program causing the computer to function as:

content information obtaining means for obtaining content information that indicates content;

content emotion information generation means for generating, with reference to the content information, content emotion information that indicates an emotion related to the content; and foodstuff information output means for outputting, with reference to the content emotion information and foodstuff emotion information that indicates emotions related to respective foodstuffs included in a foodstuff group, foodstuff information that indicates one or more foodstuffs from the foodstuff group, the one or more foodstuffs being related to an emotion correlating with the emotion indicated by the content emotion information.

(Supplementary Note C2)

The information processing program according to Supplementary note C1, further causing the computer to function as text information output means for outputting, with reference to the content emotion information and the foodstuff information, text information that indicates text in which the emotion indicated by the content emotion information is associated with the one or more foodstuffs indicated by the foodstuff information.
(Supplementary Note C3)

The information processing program according to Supplementary note C1 or C2, further causing the computer to function as foodstuff emotion information generation means for inputting, into a model trained by performing machine learning, analysis object information that indicates a foodstuff and an emotion associated with the foodstuff, to generate the foodstuff emotion information that indicates the emotions related to the respective foodstuffs.
(Supplementary Note C4)

The information processing program according to any one of Supplementary notes C1 to C3, wherein the content emotion information is information in which a type of the emotion related to the content and a strength of the emotion are associated with each other, the foodstuff emotion information is information in which a type of each of the emotions related to the respective foodstuffs and a strength of the emotion are associated with each other, and the foodstuff information output means outputs the foodstuff information based on a correlation between the type and the strength of the emotion indicated by the content emotion information, and the type and the strength of the emotion indicated by the foodstuff emotion information.
(Supplementary Note C5)

The information processing program according to any one of Supplementary notes C1 to C4, further causing the computer to function as food product information output means for outputting, with reference to the foodstuff information, either or both of (i) food product information that indicates a food product including at least one of the one or more foodstuffs indicated by the foodstuff information and (ii) advisory information including the food product information and adapted to assist a user to make a decision.
(Supplementary Note C6)

The information processing program according to any one of Supplementary notes C1 to C5, wherein the content information is text data.
[Additional Remark D]

The present disclosure includes techniques described in supplementary notes below. Note, however, that the present invention is not limited to the techniques described in supplementary notes below, but may be altered in various ways by a skilled person within the scope of the claims.
(Supplementary Note D1)

An information processing apparatus including at least one processor, the at least one processor carrying out:

a content information obtaining process of obtaining content information that indicates content;

a content emotion information generation process of generating, with reference to the content information, content emotion information that indicates an emotion related to the content; and a foodstuff information output process of outputting, with reference to the content emotion information and foodstuff emotion information that indicates emotions related to respective foodstuffs included in a foodstuff group, foodstuff information that indicates one or more foodstuffs from the foodstuff group, the one or more foodstuffs being related to an emotion correlating with the emotion indicated by the content emotion information.

Here, the information processing apparatus may further include a memory. Further, the memory may store a program for causing the at least one processor to carry out each of the processes.

(Supplementary Note D2)

The information processing apparatus according to Supplementary note D1, wherein the at least one processor further carries out a text information output process of outputting, with reference to the content emotion information and the foodstuff information, text information that indicates text in which the emotion indicated by the content emotion information is associated with the one or more foodstuffs indicated by the foodstuff information.

(Supplementary Note D3)

The information processing apparatus according to Supplementary note D1 or D2, wherein the at least one processor further carries out a foodstuff emotion information generation process of inputting, into a model trained by performing machine learning, analysis object information that indicates a foodstuff and an emotion associated with the foodstuff, to generate the foodstuff emotion information that indicates the emotions related to the respective foodstuffs.

(Supplementary Note D4)

The information processing apparatus according to any one of Supplementary notes D1 to D3, wherein the content emotion information is information in which a type of the emotion related to the content and a strength of the emotion are associated with each other, the foodstuff emotion information is information in which a type of each of the emotions related to the respective foodstuffs and a strength of the emotion are associated with each other, and in the foodstuff information output process, the at least one processor outputs the foodstuff information based on a correlation between the type and the strength of the emotion indicated by the content emotion information, and the type and the strength of the emotion indicated by the foodstuff emotion information.

(Supplementary Note D5)

The information processing apparatus according to any one of Supplementary notes D1 to D4, wherein the at least one processor further carries out a food product information output process of outputting, with reference to the foodstuff information, either or both of (i) food product information that indicates a food product including at least one of the one or more foodstuffs indicated by the foodstuff information and (ii) advisory information including the food product information and adapted to assist a user to make a decision.

(Supplementary Note D6)

The information processing apparatus according to any one of Supplementary notes D1 to D5, wherein the content information is text data.

[Additional Remark E]

The present disclosure includes techniques described in supplementary notes below. Note, however, that the present invention is not limited to the techniques described in supplementary notes below, but may be altered in various ways by a skilled person within the scope of the claims.

(Supplementary Note E1)

A non-transitory storage medium storing an information processing program for causing a computer to function as an information processing apparatus, the program causing the computer to carry out:

a content information obtaining process of obtaining content information that indicates content;

a content emotion information generation process of generating, with reference to the content information, content emotion information that indicates an emotion related to the content; and a foodstuff information output process of outputting, with reference to the content emotion information and foodstuff emotion information that indicates emotions related to respective foodstuffs included in a foodstuff group, foodstuff information that indicates one or more foodstuffs from the foodstuff group, the one or more foodstuffs being related to an emotion correlating with the emotion indicated by the content emotion information.

REFERENCE SIGNS LIST 1, 1A Information processing apparatus
11, 21 Content information obtaining section (content information obtaining means)
12, 22 Content emotion information generation section (content emotion information generation means)
13, 25 Foodstuff information output section (foodstuff information output means)
23 Analysis object information obtaining section (analysis object information obtaining means)
24 Foodstuff emotion information generation section (foodstuff emotion information generation means)
26 Text information output section (text information output means)
27 Food product information output section (food product information output means)
20A Storage section
30A Communication section
40A Input/output section

The invention claimed is:
1. An information processing apparatus comprising:
at least one processor configured to carry out:
    a content information obtaining process of obtaining content information that indicates content;
    a content emotion information generation process of generating, by inputting the content information into a trained emotion analysis model, content emotion information that indicates an emotion related to the content, the content emotion information comprising a content emotion vector that comprises a set of numerical values each representing a strength of a corresponding one of a plurality of emotion types in a multi-dimensional emotion space; and
    a foodstuff information output process of outputting, with reference to the content emotion information and foodstuff emotion information that indicates emotions related to respective foodstuffs in a foodstuff group, foodstuff information that indicates one or more foodstuffs from the foodstuff group, the one or more foodstuffs being related to an emotion correlating with the emotion indicated by the content emotion information,
wherein the foodstuff emotion information comprises a plurality of foodstuff emotion vectors each corresponding to a respective foodstuff in the foodstuff group, the plurality of foodstuff emotion vectors being stored in a foodstuff emotion database, each foodstuff emotion vector comprising a set of numerical values in the multi-dimensional emotion space, and wherein the foodstuff information output process comprises:

calculating, for each of the plurality of foodstuff emotion vectors stored in the foodstuff emotion database, a correlative score with the content emotion vector by comparing respective sets of numerical values in the multi-dimensional emotion space; and identifying, as the one or more foodstuffs, one or more foodstuffs corresponding to foodstuff emotion vectors for which the calculated correlative score exceeds a predetermined threshold.

2. The information processing apparatus of claim 1, wherein the at least one processor is further configured to carry out a text information output process of outputting, with reference to the content emotion information and the foodstuff information, text information that indicates text in which the emotion indicated by the content emotion information is associated with the one or more foodstuffs indicated by the foodstuff information.

3. The information processing apparatus of claim 1, wherein the at least one processor is further configured to carry out a foodstuff emotion information generation process of:

training, by performing machine learning, a model using training data comprising, for each of a plurality of foodstuffs in the foodstuff group, analysis object information that indicates the foodstuff and label information indicating an emotion associated with the foodstuff; and generating, by inputting the analysis object information that indicates a foodstuff into the model after the training, a foodstuff emotion vector corresponding to the foodstuff, the foodstuff emotion vector being one of the plurality of foodstuff emotion vectors stored in the foodstuff emotion database.

4. The information processing apparatus of claim 1, wherein the content emotion information is information in which a type of the emotion related to the content and a strength of the emotion are associated with each other, wherein the foodstuff emotion information is information in which a type of each of the emotions related to the respective foodstuffs and a strength of the emotion are associated with each other, and wherein, in the foodstuff information output process, the at least one processor is configured to output the foodstuff information based on a correlation between the type and the strength of the emotion indicated by the content emotion information, and the type and the strength of the emotion indicated by the foodstuff emotion information.

5. The information processing apparatus of claim 1, wherein the at least one processor is further configured to carry out a food product information output process of outputting, with reference to the foodstuff information, at least one of food product information that indicates a food product comprising at least one of the one or more foodstuffs indicated by the foodstuff information and advisory information comprising the food product information and adapted to assist a user to make a decision.

6. The information processing apparatus of claim 1, wherein the content information is text data.

7. The information processing apparatus of claim 1, wherein the at least one processor is configured to store the content emotion vector and each of the plurality of foodstuff emotion vectors, in a storage section, as tabular data in which, for each of the plurality of emotion types, a corresponding one of the numerical values represents the strength of the emotion type.

8. The information processing apparatus of claim 1, wherein the calculating of the correlative score comprises inputting the content emotion vector and each of the plurality of foodstuff emotion vectors into a correlation analytic model that outputs the correlative score.

9. An information processing method comprising:

a content information obtaining process of obtaining, by at least one processor, content information that indicates content;

a content emotion information generation process of generating, by the at least one processor and by inputting the content information into a trained emotion analysis model, content emotion information that indicates an emotion related to the content, the content emotion information comprising a content emotion vector that comprises a set of numerical values each representing a strength of a corresponding one of a plurality of emotion types in a multi-dimensional emotion space; and a foodstuff information output process of outputting, by the at least one processor, with reference to the content emotion information and foodstuff emotion information that indicates emotions related to respective foodstuffs in a foodstuff group, foodstuff information that indicates one or more foodstuffs from the foodstuff group, the one or more foodstuffs being related to an emotion correlating with the emotion indicated by the content emotion information wherein the foodstuff emotion information comprises a plurality of foodstuff emotion vectors each corresponding to a respective foodstuff in the foodstuff group, the plurality of foodstuff emotion vectors being stored in a foodstuff emotion database, each foodstuff emotion vector comprising a set of numerical values in the multi-dimensional emotion space, and wherein the foodstuff information output process comprises:

calculating, for each of the plurality of foodstuff emotion vectors stored in the foodstuff emotion database, a correlative score with the content emotion vector by comparing respective sets of numerical values in the multi-dimensional emotion space; and identifying, as the one or more foodstuffs, one or more foodstuffs corresponding to foodstuff emotion vectors for which the calculated correlative score exceeds a predetermined threshold.

10. The information processing method of claim 9, further comprising:

a text information output process of outputting, by the at least one processor and with reference to the content emotion information and the foodstuff information, text information that indicates text in which the emotion indicated by the content emotion information is associated with the one or more foodstuffs indicated by the foodstuff information.

11. The information processing method of claim 9, further comprising:

a foodstuff emotion information generation process of:

training, by performing machine learning, a model using training data including, for each of a plurality of foodstuffs in the foodstuff group, analysis object information that indicates the foodstuff and label information indicating an emotion associated with the foodstuff; and generating, by inputting the analysis object information that indicates a foodstuff into the model after the training, a foodstuff emotion vector corresponding to the foodstuff, the foodstuff emotion vector being one of the plurality of foodstuff emotion vectors stored in the foodstuff emotion database.

12. The information processing method of claim 9, wherein the content emotion information is information in which a type of the emotion related to the content and a strength of the emotion are associated with each other, wherein the foodstuff emotion information is information in which a type of each of the emotions related to the respective foodstuffs and a strength of the emotion are associated with each other, and wherein, in the foodstuff information output process, the foodstuff information is output based on a correlation between the type and the strength of the emotion indicated by the content emotion information, and the type and the strength of the emotion indicated by the foodstuff emotion information.

13. The information processing method of claim 9, wherein the content information comprises text data.

14. The information processing method of claim 9, further comprising:

storing, by the at least one processor, the content emotion vector and each of the plurality of foodstuff emotion vectors, in a storage section, as tabular data in which, for each of the plurality of emotion types, a corresponding one of the numerical values represents the strength of the emotion type.

15. The information processing method of claim 9, wherein the calculating of the correlative score comprises inputting the content emotion vector and each of the plurality of foodstuff emotion vectors into a correlation analytic model that outputs the correlative score.

16. A non-transitory storage medium storing a program for causing a computer to carry out:

a content information obtaining process of obtaining content information that indicates content;

a content emotion information generation process of generating, with reference to the content information and by inputting the content information into a trained emotion analysis model, content emotion information that indicates an emotion related to the content; and a foodstuff information output process of outputting, with reference to the content emotion information and foodstuff emotion information that indicates emotions related to respective foodstuffs in a foodstuff group, foodstuff information that indicates one or more foodstuffs from the foodstuff group, the one or more foodstuffs being related to an emotion correlating with the emotion indicated by the content emotion information, wherein the foodstuff emotion information comprises a plurality of foodstuff emotion vectors each corresponding to a respective foodstuff in the foodstuff group, the plurality of foodstuff emotion vectors being stored in a foodstuff emotion database, each foodstuff emotion vector comprising a set of numerical values in the multi-dimensional emotion space, and wherein the foodstuff information output process comprises:

calculating, for each of the plurality of foodstuff emotion vectors stored in the foodstuff emotion database, a correlative score with the content emotion vector by comparing respective sets of numerical values in the multi-dimensional emotion space; and identifying, as the one or more foodstuffs, one or more foodstuffs corresponding to foodstuff emotion vectors for which the calculated correlative score exceeds a predetermined threshold.

17. The non-transitory storage medium of claim 16, wherein the program further causes the computer to carry out a text information output process of outputting, with reference to the content emotion information and the foodstuff information, text information that indicates text in which the emotion indicated by the content emotion information is associated with the one or more foodstuffs indicated by the foodstuff information.

18. The non-transitory storage medium of claim 16, wherein the program further causes the computer to carry out a foodstuff emotion information generation process of:

training, by performing machine learning, a model using training data including, for each of a plurality of foodstuffs in the foodstuff group, analysis object information that indicates the foodstuff and label information indicating an emotion associated with the foodstuff; and generating, by inputting the analysis object information that indicates a foodstuff into the model after the training, a foodstuff emotion vector corresponding to the foodstuff, the foodstuff emotion vector being one of a plurality of foodstuff emotion vectors stored in a foodstuff emotion database.

19. The non-transitory storage medium of claim 16, wherein, in the program, the content emotion information is information in which a type of the emotion related to the content and a strength of the emotion are associated with each other, wherein the foodstuff emotion information is information in which a type of each of the emotions related to the respective foodstuffs and a strength of the emotion are associated with each other, and wherein, in the foodstuff information output process, the foodstuff information is output based on a correlation between the type and the strength of the emotion indicated by the content emotion information, and the type and the strength of the emotion indicated by the foodstuff emotion information.

20. The non-transitory storage medium of claim 16, wherein the program further causes the computer to:

store a content emotion vector and each of a plurality of foodstuff emotion vectors, in a storage section, as tabular data in which, for each of a plurality of emotion types, a corresponding one of the numerical values represents the strength of the emotion type; and calculate a correlative score by inputting the content emotion vector and each of the plurality of foodstuff emotion vectors into a correlation analytic model that outputs the correlative score.

* * * * *